(12) United States Patent  
Aratani et al.

(10) Patent No.: US 8,229,042 B2  
(45) Date of Patent: Jul. 24, 2012

(54) ORTHOGONAL FREQUENCY DIVISION MULTIPLEXING DEMODULATOR

(75) Inventors: Koichi Aratani, Yokohama (JP); Hirotake Ishii, Yokohama (JP); Dan Xu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 469 days.

(21) Appl. No.: 12/575,057

(22) Filed: Oct. 7, 2009

(65) Prior Publication Data

US 2010/0086084 A1  Apr. 8, 2010

(30) Foreign Application Priority Data

Oct. 8, 2008 (JP) ................................. 2008-261206

(51) Int. Cl.  
*H04L 27/06* (2006.01)
(52) U.S. Cl. ........ 375/344; 375/260; 375/316; 375/261; 375/259; 375/354; 375/355; 375/357; 375/371; 375/340

(58) Field of Classification Search .................. 375/260, 375/316, 261, 259, 354, 355, 357, 371, 340, 375/344  
See application file for complete search history.

(56) References Cited

U.S. PATENT DOCUMENTS  
5,608,764 A 3/1997 Sugita et al.

FOREIGN PATENT DOCUMENTS  
JP 03-041175 3/2000

*Primary Examiner* — Siu Lee  
(74) *Attorney, Agent, or Firm* — Antonelli, Terry, Stout & Kraus, LLP.

(57) ABSTRACT

An OFDM demodulator which does not require a reference signal for synchronization of carriers and can reduce influence of phase rotation by a propagation path when carrier synchronization is made. The OFDM demodulator performs Fourier transform plural times in 2 or more different operation ranges for the same OFDM symbol, calculates phases of sub carriers from the plural-time results of the Fourier transform, compares the calculated phases for each of the plural-time results of the Fourier transform and detects an error in frequency of reproduction carrier from the compared results.

8 Claims, 8 Drawing Sheets

ORTHOGONAL FREQUENCY DIVISION MULTIPLEXING DEMODULATOR

INCORPORATION BY REFERENCE

The present application claims priority from Japanese application JP2008-261206 filed on Oct. 8, 2008, the content of which is hereby incorporated by reference into this application.

BACKGROUND OF THE INVENTION

The present invention relates to an orthogonal frequency division multiplexing (hereinafter abbreviated to OFDM) demodulator and more particularly a circuit for performing carrier synchronization.

Recently, in the ground-wave digital television broadcasting and the wireless local area network (LAN), an OFDM method which is highly resistant to the multipath interference is used. In the OFDM method, transmission digital data is broken up into a plurality of orthogonal carrier waves to be modulated so that communication is performed.

The modulated OFDM waves in the OFDM method are composed of a plurality of sub orthogonal carrier waves and the sub carrier waves are named sub carriers. Each sub carrier is modulated by the modulation method such as the phase shift keying (PSK) and the quadrature amplitude modulation (QAM). In this manner, in the OFDM method, data is transmitted in parallel by a large number of orthogonal sub carriers and accordingly the time length of symbol can be made long. Moreover, as shown in FIG. 2, the OFDM symbol includes a guard period named a cyclic prefix (CP). The cyclic prefix is a copy of end part of effective symbol so as to maintain the continuity of the waveform in the boundary between the cyclic prefix and the effective symbol and if the delay time of multipath delayed waves comes into the length of the cyclic prefix, interference does not occur between front and rear symbols.

Furthermore, in the OFDM method, since data is multiplexed to a large number of sub carriers, it is general that the inverse fast Fourier transform (IFFT) is performed on the transmission side and the fast Fourier transform (FFT) is performed on the reception side. An FFT window shown in FIG. 2 represents the operation range and the start position of the FFT operation is selected from any position from the top to the end of the cyclic prefix. Since the cyclic prefix is a copy of end part of the effective symbol so as to maintain the continuity of the waveform in the boundary of the cyclic prefix and the effective symbol, the orthogonality among the sub carriers can be maintained as far as the start position of the FFT operation is within the operation range.

In order to demodulate the modulated OFDM waves by the OFDM demodulator, synchronization of every kind is required. Particularly, synchronization of the symbol timing for detecting the boundary position of the OFDM symbol and synchronization of the carrier frequency for synchronizing carrier frequency of the modulated OFDM waves with a carrier frequency for reproduction used on the reception side are required and a number of methods have been proposed until now.

For example, U.S. Pat. No. 5,608,764 (Japanese Patent No. 3041175) (patent document 1) discloses the method of performing clock synchronization without using a reference signal for the clock synchronization. In this method, constellation is analyzed on the basis of the result of the FFT operation and an error in the carrier frequency for orthogonal demodulation and an error in frequency of a sampling clock for analog-to-digital (A/D) conversion are judged and corrected from the phase rotation direction of 2 or more different sub carriers.

SUMMARY OF THE INVENTION

In the method disclosed in the patent document 1, however, when the sub carriers used for the judgment is subjected to the phase rotation by a propagation path, there arises a problem that there is a possibility that wrong judgment is made and variation of the propagation path has large influence. Moreover, since the carriers for the orthogonal demodulation and the sampling clock for the A/D conversion are not synchronized with each other, it is necessary to make both synchronization procedures separately and it takes time to get the synchronization.

Further, the OFDM method uses a large number of sub carriers, although all of the sub carriers are not always used for communication. Moreover, the quality of sub carrier having a partial frequency is sometimes deteriorated due to fading having the selectivity of frequency in the propagation path. There arises a problem that when the sub carrier not used in the communication or the sub carrier having the deteriorated quality as described above is used to perform the carrier synchronization, the accuracy of synchronization is deteriorated.

An OFDM demodulator according to the present invention comprises orthogonal demodulation means to orthogonally demodulate modulated OFDM waves using reproduction carrier and get an OFDM baseband signal, Fourier transform means to Fourier transform the OFDM baseband signal gotten by the orthogonal demodulation means into an OFDM frequency domain signal for each sub carrier, operation range decision means to detect a boundary position of symbol of the OFDM baseband signal gotten by the orthogonal demodulation means and decide 2 or more different operation ranges of the Fourier transform for the same OFDM symbol on the basis of the boundary position of the symbols, Fourier transform control means to control the Fourier transform means so as to perform the Fourier transform for the 2 or more operation ranges decided by the operation range decision means, frequency error detection means to calculate phases of sub carriers on the basis of results of the Fourier transform for the 2 or more operation ranges and compare the calculated phases for each of the results of the Fourier transform so that an error in frequency of the reproduction carrier is detected on the basis of the compared result, and clock control means to control the frequency of the reproduction carrier on the basis of the error in frequency of the reproduction carrier detected by the frequency error detection means.

According to the present invention, there is provided the OFDM demodulator which does not require a reference signal for synchronization of carriers and can reduce influence of phase rotation by a propagation path when carrier synchronization is performed. Furthermore, it is not necessary to synchronize carriers for orthogonal demodulation and a sampling clock for A/D conversion separately and time required to get synchronization can be reduced. In addition, sub carriers with good quality are used to perform carrier synchronization and accuracy of synchronization can be improved.

Other objects, features and advantages of the invention will become apparent from the following description of the embodiments of the invention taken in conjunction with the accompanying drawings.

DETAILED DESCRIPTION OF THE EMBODIMENTS

Embodiments of the present invention are now described in detail with reference to the accompanying drawings.

Embodiment 1

Figure 1:
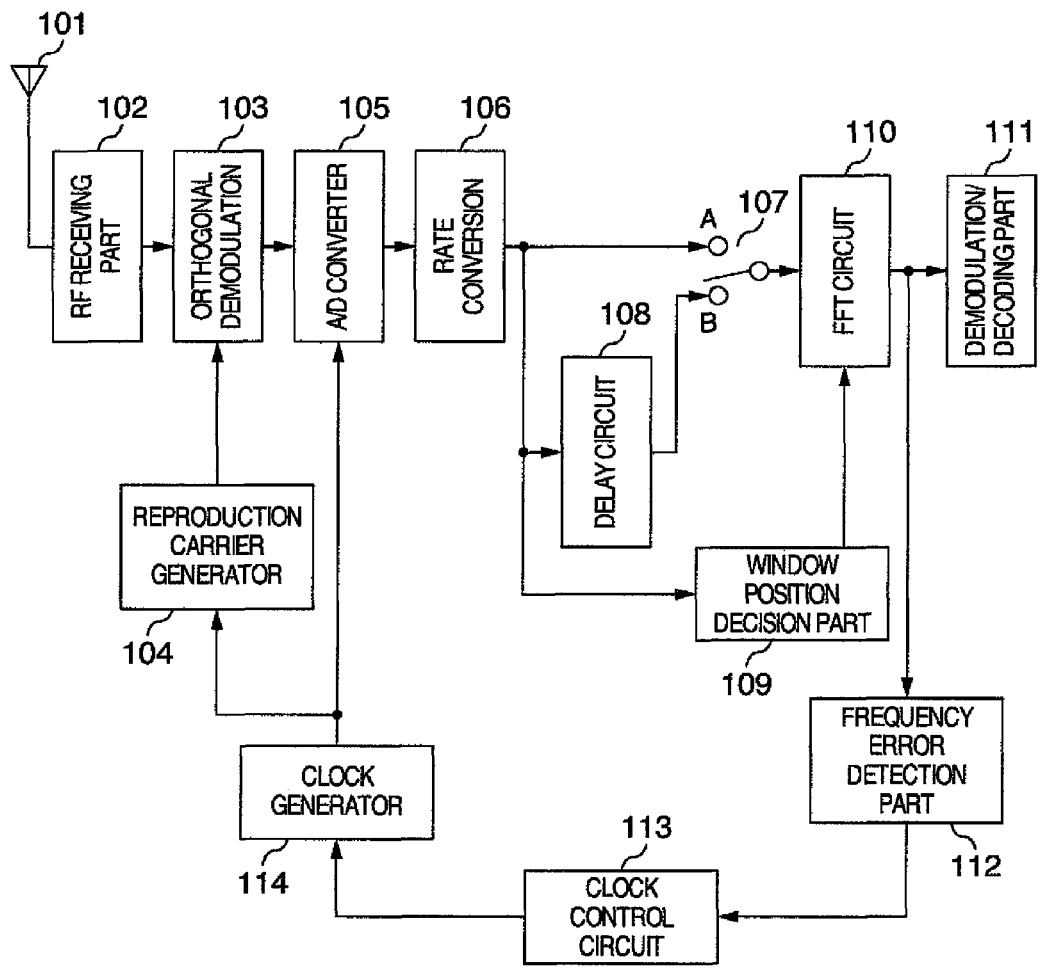
FIG. 1 is a block diagram schematically illustrating an OFDM demodulator according to an embodiment of the present invention.
Figure 2:
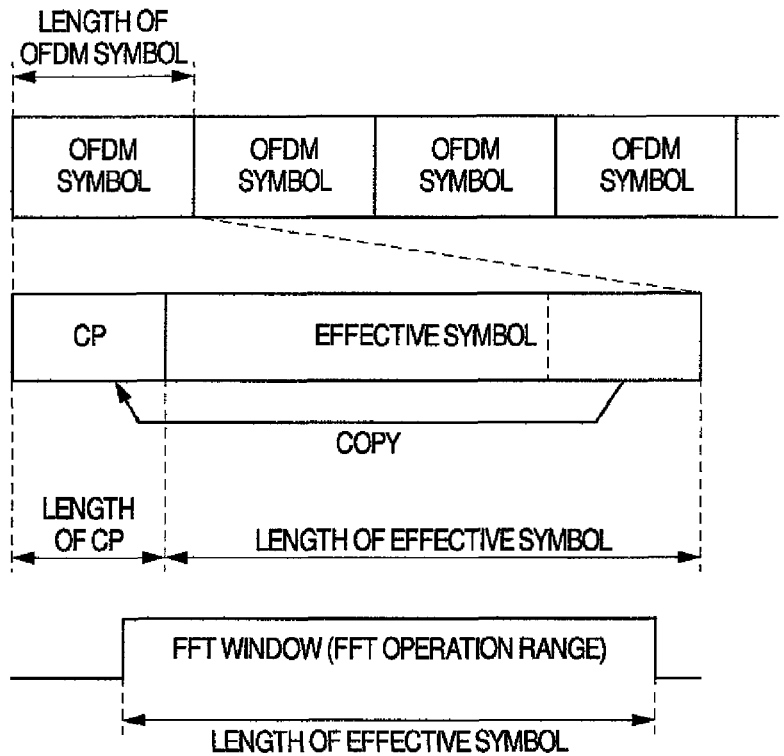
FIG. 2 is a diagram showing the positional relation of a cyclic prefix and an FFT window in an OFDM symbol.

FIG. 1 is an example of a block diagram schematically illustrating an OFDM demodulator according to an embodiment of the present invention. In the OFDM demodulator of FIG. 1, the FFT operation for the same OFDM symbol is performed twice by way of example, although even if the operation is performed three or more times, the present invention can be realized and is not limited thereto.

Operation of the block diagram shown in FIG. 1 is now described. Modulated OFDM waves inputted from an antenna 101 are supplied to an RF receiving part 102. The RF receiving part 102 subjects the modulated OFDM waves to band restriction, signal amplification and frequency conversion to be converted into IF signal and supplies the IF signal to an orthogonal demodulation circuit 103. The orthogonal demodulation circuit 103 performs orthogonal demodulation using reproduction carrier supplied from a reproduction carrier generator 104 and converts the IF signal into an analog OFDM baseband signal to be outputted. The analog OFDM baseband signal is supplied to an analog-to-digital (A/D) conversion circuit 105. The A/D conversion circuit 105 samples the analog OFDM baseband signal in synchronism with a sampling clock supplied from a clock generator 114 and converts it into digital OFDM baseband signal. The digital OFDM baseband signal is supplied to a rate conversion circuit 106.

In FIG. 1, in an example of Fourier transform control means for performing the FFT operation for the same OFDM symbol twice, the rate conversion circuit 106, a switch 107 and a delay circuit 108 are used to operate an FFT circuit 110 in the time division multiplexing manner. More particularly, the OFDM baseband signal supplied to the rate conversion circuit 106 is rate-converted into the signal having the rate that is two times as high as the sampling clock and supplied to the switch 107, the delay circuit 108 and a window position decision part 109. The switch 107 is first connected to a contact point A to supply the OFDM baseband signal for first-time FFT operation with respect to the same OFDM symbol to the FFT circuit 110. After the signal for the first-time FFT operation is supplied, the switch is connected to a contact point B.

Figure 3:
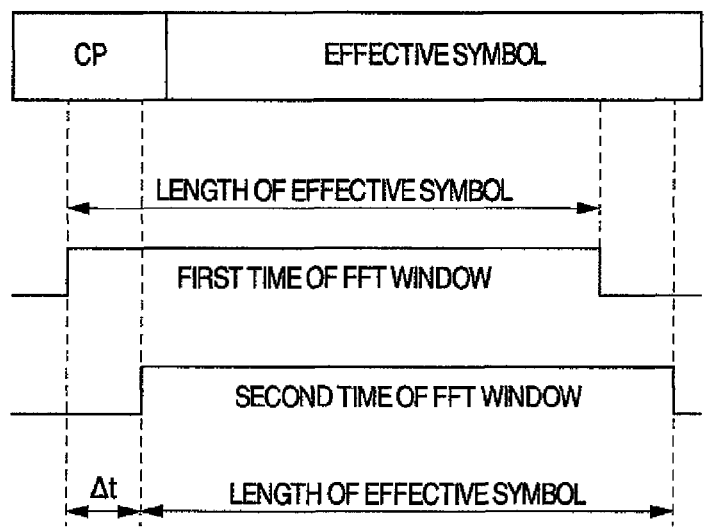
FIG. 3 is a diagram showing FFT window positions in case where FFT is applied to the same OFDM symbol twice.

On the other hand, the delay circuit 108 delays the OFDM baseband signal by predetermined time and supplies the OFDM baseband signal for the second-time FFT operation with respect to the same OFDM symbol to the FFT circuit 110 through the switch 107. The window position decision part 109 utilizes the correlation between the cyclic prefix and the end part of the OFDM symbol contained in the OFDM baseband signal to detect the boundary of the OFDM symbol and decides the FFT operation range or the FFT window position for the same OFDM symbol twice to be notified to the FFT circuit 110. The concrete start position of the FFT operation is selected from any position from the top to the end of the cyclic prefix, although as shown in FIG. 3 different positions are selected for the first and second times for the same OFDM symbol. The window position decision part is to decide the operation range of the Fourier transform and accordingly is also named an operation range decision part.

Figure 4:
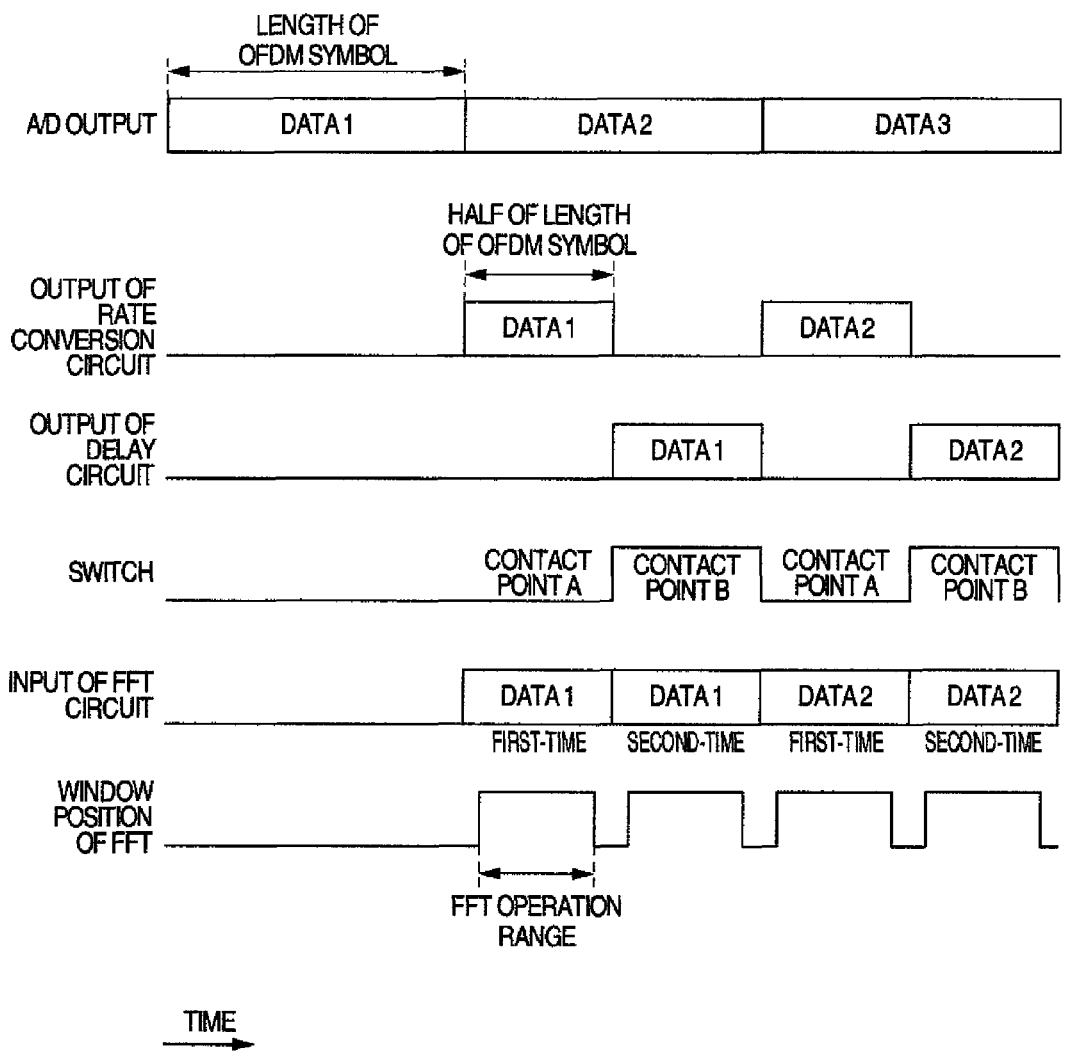
FIG. 4 is a timing chart showing operation of peripheral parts of an FFT circuit used in the OFDM demodulator of FIG. 1.

FIG. 4 shows an example of the concrete operation timing of the rate conversion circuit 106, the switch 107, the delay circuit 108 and the window position decision part 109. Referring now to FIG. 4, operation of the OFDM demodulator shown by the block diagram in FIG. 1 is described in detail. FIG. 4 is a timing chart showing the timing of output and input signals of respective parts and the axis of abscissa represents time. Data 1, 2 and 3 each represent data for 1 symbol of the OFDM baseband signal.

The OFDM baseband signal outputted from the A/D conversion circuit 105, that is, the data 1 of A/D output of FIG. 4 is rate-converted into the signal having the rate that is two times as high as the sampling clock by the rate conversion circuit 106 and is outputted as the signal having the length of time equal to a half of 1 OFDM symbol (data 1 of output of the rate conversion circuit in FIG. 4). At this time, the switch 107 is connected to the contact point A to supply the OFDM baseband signal for the first-time FFT operation (data 1 for first time in input of FFT circuit in FIG. 4) with respect to the same OFDM symbol to the FFT circuit 110. After the signal for the first-time FFT operation is supplied, the switch 107 is connected to the contact point B.

On the other hand, the delay circuit 108 delays the data 1 by half of the length of 1 OFDM symbol and supplies the OFDM baseband signal for the second-time FFT operation (data 1 for second-time in input of FFT circuit in FIG. 4) with respect to the same OFDM symbol to the FFT circuit 110 through the switch 107. The window position decision part 109 decides a proper FFT window position for the same OFDM symbol twice and notifies it to the FFT circuit 110. In this manner, the FFT operation is performed for the same OFDM symbol twice.

Returning to FIG. 1 again, operation of the FFT circuit 110 and other parts subsequent thereto is described. The FFT circuit 110 performs the FFT operation for the same OFDM symbol in accordance with the FFT window position notified by the window position decision part 109 twice and converts the OFDM baseband signal from the time domain into the frequency domain for each sub carrier twice. Hereinafter, the OFDM baseband signal converted into the frequency domain is named an OFDM frequency domain signal. The OFDM frequency domain signal is supplied from the FFT circuit 110 to a demodulation/decoding part 111 and a frequency error detection part 112. The demodulation/decoding part 111 uses any of the first- and second-time OFDM frequency domain signals for the same OFDM symbol to perform demodulation and decoding for each sub carrier in accordance with the modulation method such as PSK and QAM.

The frequency error detection part 112 uses both of the first- and second-time OFDM frequency domain signals for the same OFDM symbol to detect an error in frequency of the reproduction carrier and produces a correction signal for correcting the error to be supplied to a clock control circuit 113. The error in frequency of the reproduction carrier is an error in frequency caused by the fact that the carrier of the modulated OFDM waves received by the OFDM demodulator is not synchronized with the reproduction carrier and is caused by shift or deviation in frequency of the clock generated by the clock generator 114, for example. The method of detecting the error in frequency of the reproduction carrier is described later in detail.

The clock control circuit 113 controls the frequency of the clock generator 114 in accordance with the correction signal produced by the frequency error detection part 112. The clock generator 114 generates the clock in accordance with control by the clock control circuit 113 and supplies the clock to the A/D conversion circuit 105 and the reproduction carrier generator 104. The reproduction carrier generator 104 generates the reproduction carrier synchronized with the clock from the clock generator 114 and supplies it to the orthogonal demodulation circuit 103. In this manner, the clock generator 114 is controlled to correct the error in frequency of the reproduction carrier.

Figure 5:
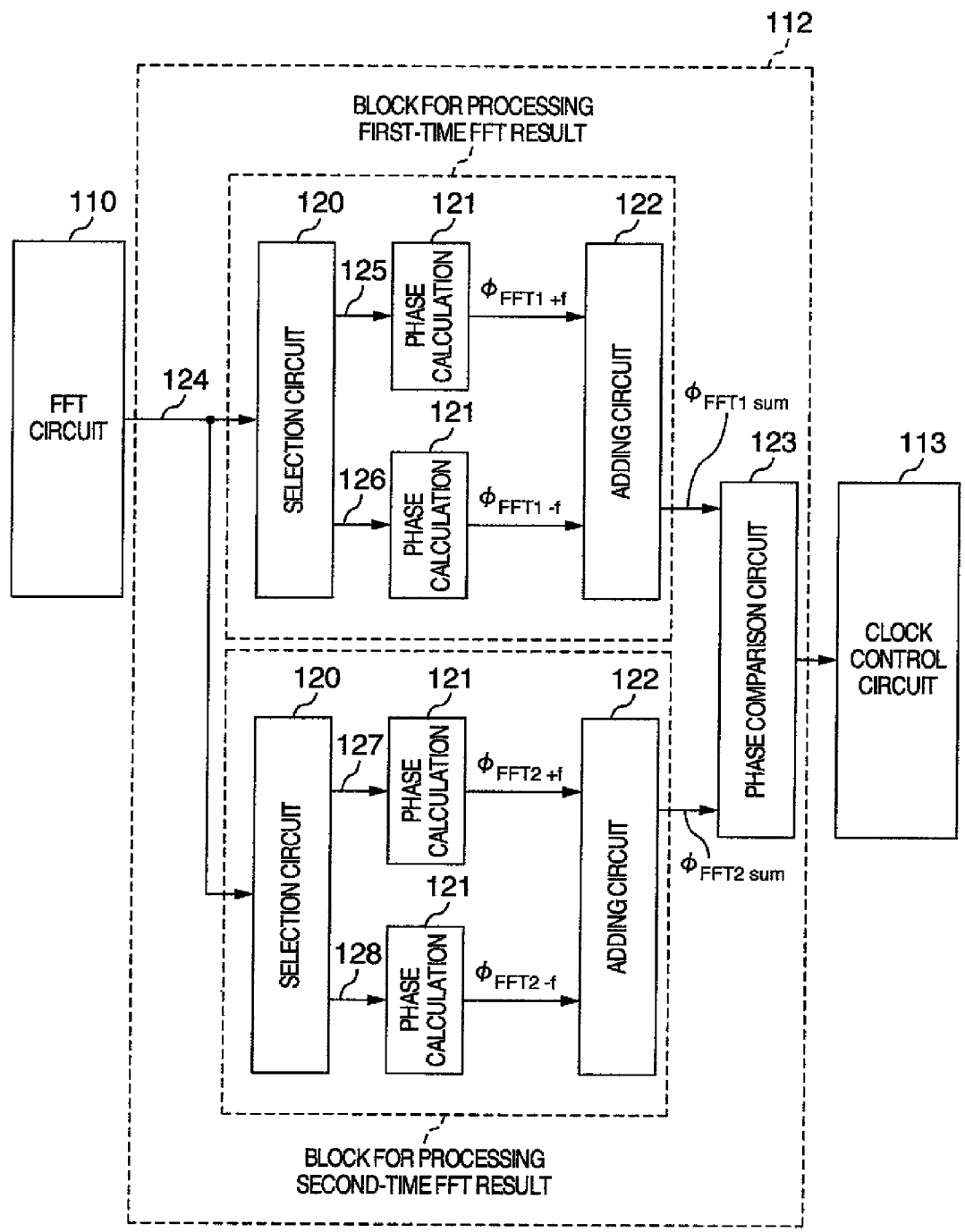
FIG. 5 is a block diagram illustrating an example of a frequency error detection part used in the OFDM demodulator of FIG. 1 in detail.

The method of detecting the error in frequency of the reproduction carrier is now described concretely. FIG. 5 is a block diagram illustrating an example of the frequency error detection part 112 shown in FIG. 1 in detail. In FIG. 5, an upper block containing a selection circuit 120 processes the first-time OFDM frequency domain signal for the same OFDM symbol and a lower block processes the second-time OFDM frequency domain signal.

The OFDM frequency domain signal 124 outputted by the FFT circuit 110 is a complex signal having a real axis component and an imaginary axis component for each sub carrier and is supplied to selection circuits 120. The selection circuit 120 of the upper block uses the first-time OFDM frequency domain signal for the same OFDM symbol and the selection circuit 120 of the lower block uses the second-time OFDM frequency domain signal. The selection circuits 120 selects a plurality of sub carriers used so as to detect the error in frequency of the reproduction carrier from the OFDM frequency domain signals for sub carriers. In this selection, the frequency of the sub carriers positioned in the center of the carrier, that is, frequency 0 is set to be the standard and at least 1 or more pairs of sub carriers of paired frequencies that are equally apart in positive and negative directions from the frequency 0 are selected. In FIG. 5, for simplification of description, a pair of +f and −f is selected from the frequency of the sub carriers and numerals 125 and 127 represent the OFDM frequency domain signals having frequency +f, 126 and 128 representing the OFDM frequency domain signals having frequency −f. The OFDM frequency domain signals 125 to 128 selected by the selection circuits 120 are supplied to phase calculation circuits 121.

The phase calculation circuits 121 calculate phases of the sub carriers from the OFDM frequency domain signals and supplies the calculated phases to adding circuits 122. In FIG. 5, $\phi FFT1+f$ represents a phase of the sub carrier frequency +f calculated from the first-time FFT result and $\phi FFT1-f$ represents a phase of the sub carrier frequency −f calculated from the first-time FFT result. Similarly, $\phi FFT2+f$ and $\phi FFT2-f$ represent phases of the sub carrier calculated from the second-time FFT result. The adding circuits 122 add the phases of the sub carrier separately for the first- and second-time FFT results and supplies the added results to a phase comparison circuit 123. The phase comparison circuit 123 compares the added phase result $\phi FFT1$ sum $(=\phi FFT1+f+\phi FFT1-f)$ for the first-time FFT result with the added phase result $\phi FFT2$ sum $(=\phi FFT2+f+\phi FFT2-f)$ for the second-time FFT result.

The phase difference occurring between $\phi FFT1+f$ and $\phi FFT2+f$ is set to $\phi FFT1\_2+f$ and the phase difference occurring between $\phi FFT1-f$ and $\phi FFT2-f$ is set to $\phi FFT1\_2-f$. As factors affecting $\phi FFT1\_2+f$ and $\phi FFT1\_2-f$, there are 4 factors of (a) to (d) as described in the following:
(a) phase difference occurring by difference in the operation start position of FFT
(b) phase difference occurring by error in frequency of the sampling clock
(c) phase difference occurring by phase rotation in the propagation path
(d) phase difference occurring by error in carrier frequency for reproduction The phase differences caused by the above 4 factors are described in order.

Figure 6:
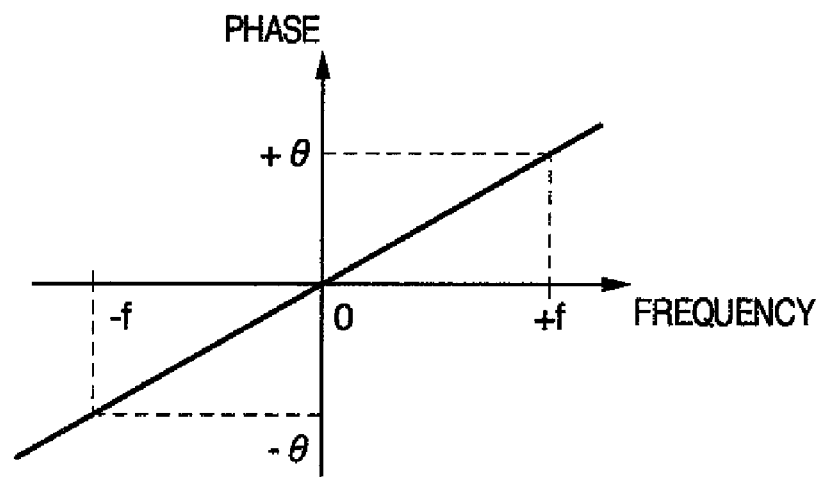
FIG. 6 is a diagram showing a frequency characteristic of phase difference produced due to difference in an operation start position of the FFT.

First, the factor (a) is described. It is assumed that there is no phase rotation in the propagation path and errors in the reproduction carrier frequency and the carrier frequency of the modulated OFDM waves and an error in frequency of the sampling clock between the modulator and demodulator are both 0. In this case, the phase difference described in (a) appears between $\phi FFT1\_2+f$ and $\phi FFT1\_2-f$. The phase difference of (a) has the frequency characteristic as shown in FIG. 6 and when the frequency of the sub carrier is f and the time difference of the operation start position is $\Delta t$, the phase difference is $2\pi f \Delta t$. Accordingly, since $\phi FFT1\_2+f$ that is the phase difference of the frequency +f and $\phi FFT1\_2-f$ that is the phase difference of the frequency −f have equal absolute value and opposite sign, $\phi FFT1$ sum and $\phi FFT2$ sum outputted by the adding circuits 122 are equal and accordingly when the outputs of the adding circuit are compared with each other in the phase comparison circuit 123, the phase difference is 0. That is, the phase comparison circuit 123 cannot detect the phase difference occurring by the difference of the operation start position of FFT as described in (a).

Next, the factor (b) is described. It is assumed that there is no phase rotation in the propagation path, an error in the reproduction carrier frequency and the carrier frequency of the modulated OFDM waves is 0 and there is an error in frequency of the sampling clock between the modulator and demodulator. In this case, the phase difference described in (b) appears in $\phi FFT1\_2+f$ and $\phi FFT1\_2-f$ in addition to the phase difference described in (a). Since the phase difference of (b) has the frequency characteristic proportional to the frequency of the sub carrier similarly to (a), $\phi FFT1\_2+f$ and $\phi FFT1\_2-f$ have equal absolute value and opposite sign. Accordingly, $\phi FFT1$ sum and $\phi FFT2$ sum are equal in the phase comparison circuit 123 and the phase difference occurring by error in frequency of the sampling clock as described in (b) cannot be detected.

Next, the factor (c) is described. It is assumed that there is the phase rotation in the propagation path and errors in the reproduction carrier frequency and the carrier frequency of the modulated OFDM waves and an error in frequency of the sampling clock between the modulator and demodulator are both 0. In this case, the phase difference described in (c) appears between $\phi FFT1\_2+f$ and $\phi FFT1\_2-f$ in addition to the phase difference of (a). The phase difference of (c) is a variation amount of the phase rotation in the propagation path, that occurs in the time difference Δt between the first- and second-time operation start positions of FFT. Accordingly, if the time difference Δt is made smaller than a variation period of the propagation path so that the variation amount of the phase rotation in the propagation path is as small as almost negligible, φFFT1 sum and φFFT2 sum are substantially equal in the phase comparison circuit 123 and the phase difference occurring by the phase rotation in the propagation path as described in (c) cannot be almost detected. In the window position decision part 109 of FIG. 1, a relatively small value (not 0) is used as the time difference Δt as described above to decide the operation range of FFT.

Figure 7:
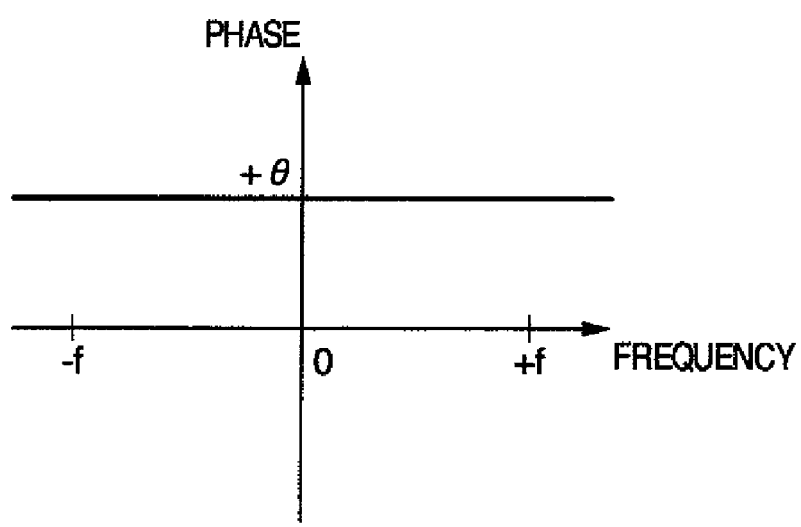
FIG. 7 is a diagram showing a frequency characteristic of phase difference produced due to difference in a carrier frequency for reproduction.

Next, the factor (d) is described. It is assumed that there is no phase rotation in the propagation path, there are errors in the reproduction carrier frequency and the carrier frequency of the modulated OFDM waves and an error in frequency of the sampling clock between the modulator and demodulator is 0. In this case, the phase difference described in (d) appears in φFFT1_2+f and φFFT1_2−f in addition to the phase difference described in (a). The phase difference of (d) exhibits the characteristic that is fixed in all sub carriers as shown in FIG. 7. Accordingly, when the phase difference of (a) is removed from φFFT1_2+f and φFFT1_2−f, the absolute values and the signs of φFFT1_2+f and φFFT1_2−f are identical and the phase comparison circuit 123 detects φFFT1 sum>φFFT2 sum or φFFT1 sum<φFFT2 sum. At this point, as shown in FIG. 3, when the first-time FFT operation start position is earlier than the second-time FFT operation start position (in direction approaching the top of the cyclic prefix), φFFT1 sum<φFFT2 sum is effected if the reproduction carrier frequency is lower than the carrier frequency. Conversely, when the reproduction carrier frequency is higher than the carrier frequency, φFFT1 sum>φFFT2 sum is effected. The phase comparison circuit 123 notifies the relation of φFFT1 sum and φFFT2 sum to the clock control circuit 113 in the form of 1 when φFFT1 sum<φFFT2 sum is detected, −1 when φFFT1 sum>φFFT2 sum is detected and 0 when φFFT1 sum=φFFT2 sum is detected, for example. The clock control circuit 113 can control the clock generator 114 in accordance with the relation of φFFT1 sum and φFFT2 sum notified by the phase comparison circuit 123 and synchronizes the carrier frequency with the reproduction carrier frequency.

Actually, all of the phase differences of (a) to (d) appear in φFFT1_2−f and φFFT1_2−f simultaneously, although φFFT1 sum and φFFT2 sum are identical in the phase comparison circuit 123 for the phase differences of (a) to (c) as described above and accordingly the phase difference due to the error in the reproduction carrier frequency of (d) can be detected.

Moreover, in the demodulator of the embodiment, the sampling clock for A/D conversion is synchronized with the reproduction carrier. If it is constructed to synchronize the sampling clock for D/A conversion with carrier even in the modulator, the sampling clock is also synchronized when the carriers are synchronized between the modulator and the demodulator and accordingly the synchronization procedure of the sampling clock is not required. Further, even if it is constructed not to synchronize the sampling clock for A/D conversion with the reproduction carrier in the demodulator, the synchronization of carriers can be attained using the present invention.

The frequency error detection part shown in FIG. 5 of the embodiment includes the block for processing the first-time FFT result and the block for processing the second-time FFT result separately, although both the blocks have quite the same configuration and accordingly both of the results may be processed by any one of blocks.

Embodiment 2

Figure 8:
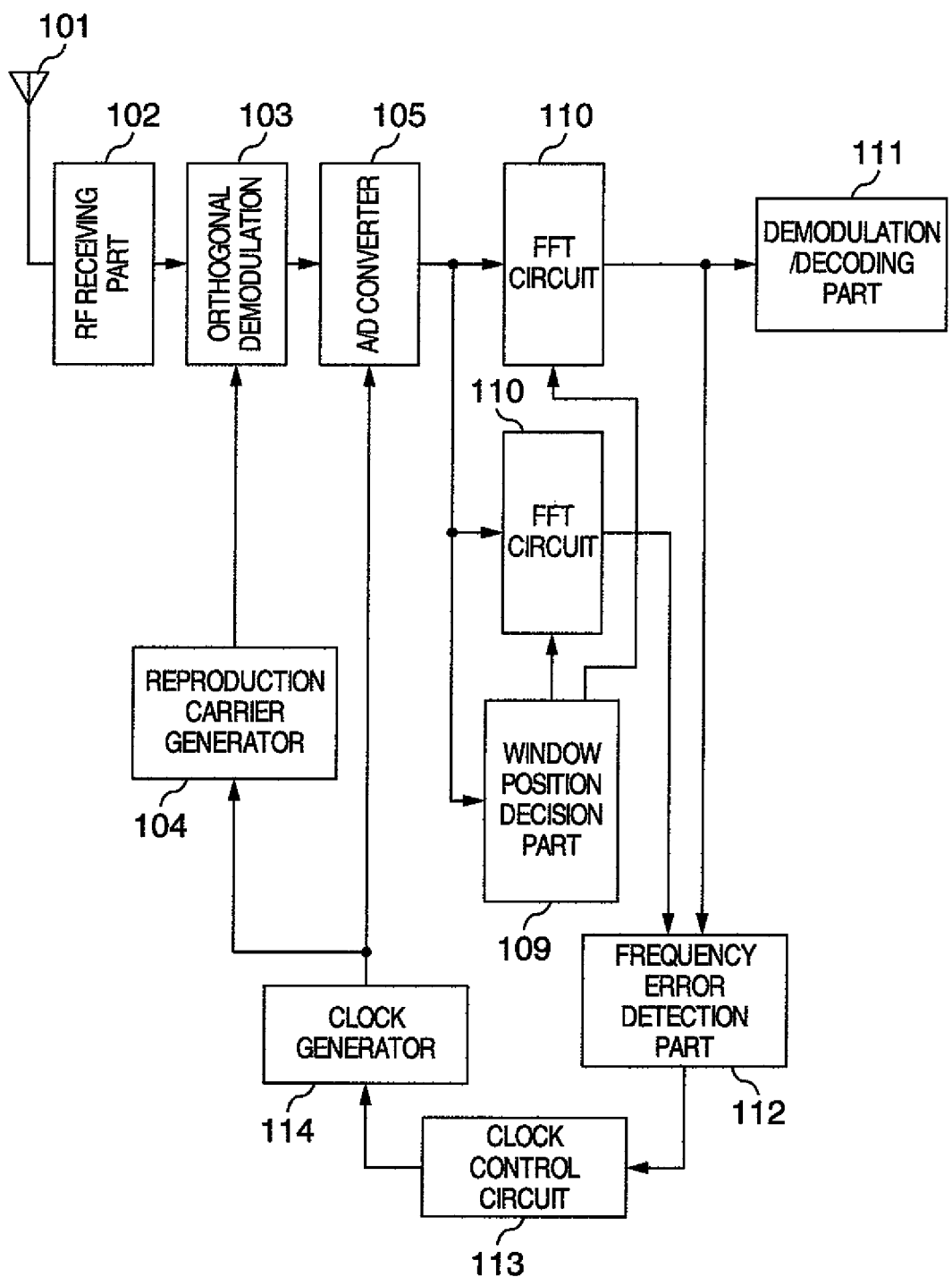
FIG. 8 is a block diagram schematically illustrating an OFDM demodulator according to another embodiment of the present invention.

FIG. 8 is a block diagram schematically illustrating an OFDM demodulator according to another embodiment of the present invention. The like elements to those shown in FIG. 1 are designated by like reference numerals.

FIG. 8 shows an example that the FFT operation is performed for the same OFDM symbol twice similarly to FIG. 1. In FIG. 8, as an example of Fourier transform control means for performing the FFT operation for the same OFDM symbol twice, 2 FFT circuits 110 are provided. The window position decision part 109 notifies FFT window positions having different FFT operation ranges to the respective FFT circuits 110 and makes the respective FFT circuits 110 perform the FFT operation in the respective different operation ranges. For example, one of the 2 FFT circuits 110 provided on the upper side performs the first-time FFT operation and the other performs the second-time FFT operation, so that the FFT operation results thereof are supplied to the frequency error detection part 112. Operation of the frequency error detection part 112 is the same as that of the embodiment 1 and accordingly description thereof is omitted.

Embodiment 3

Figure 9:
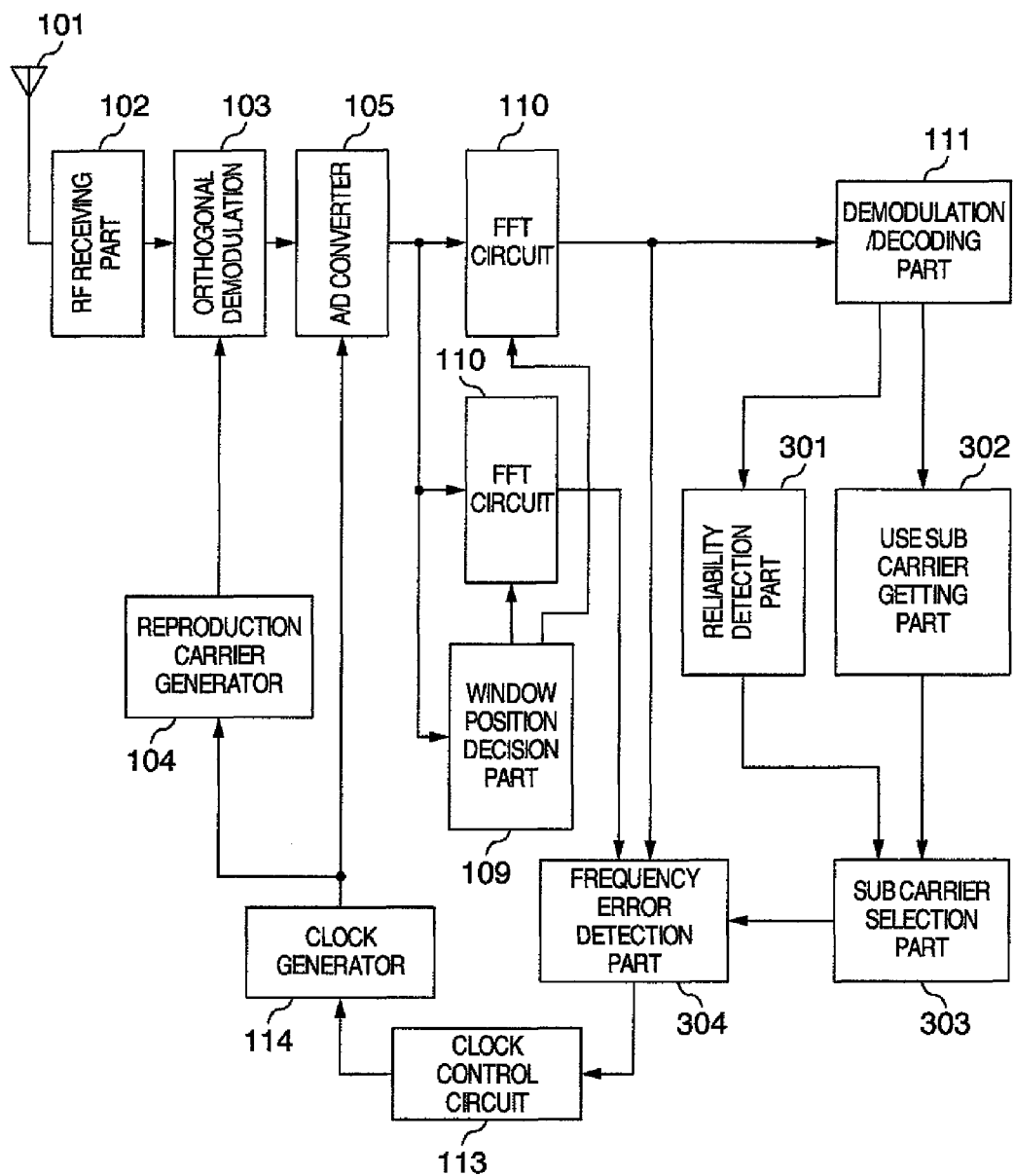
FIG. 9 is a block diagram schematically illustrating an OFDM demodulator according to a further embodiment of the present invention.

FIG. 9 is a block diagram schematically illustrating an OFDM demodulator according to a further embodiment of the present invention. The like elements to those shown in FIG. 8 are designated by like reference numerals.

FIG. 9 shows an example that the FFT operation is performed for the same OFDM symbol twice similarly to FIG. 8. FIG. 9 is different from FIG. 8 in that a reliability detection part 301, a use sub carrier getting (acquisition) part 302, a sub carrier selection part 303 and a frequency error detection part 304 are provided and operation of these parts is described below.

The OFDM method uses a large number of sub carries, although all of sub carriers are not always used for communication. Accordingly, the use sub carrier getting part 302 has information concerning the sub carrier used in communication as known information in the apparatus in advance or gets it by means of sub carrier (generally frequency is previously known) for control upon start of communication or during communication and notifies the sub carrier used in communication to the sub carrier selection part 303. Furthermore, the reliability detection part 301 judges the reliability of each sub carrier on the basis of information such as bit error rate or amplitude of sub carrier and notifies it to the sub carrier selection part 303. The sub carrier selection part 303 selects the sub carrier having high reliability (e.g. lower error rate) from the notified sub carriers used in communication and notifies the sub carrier used in carrier synchronization to the frequency error detection part 304.

Figure 10:
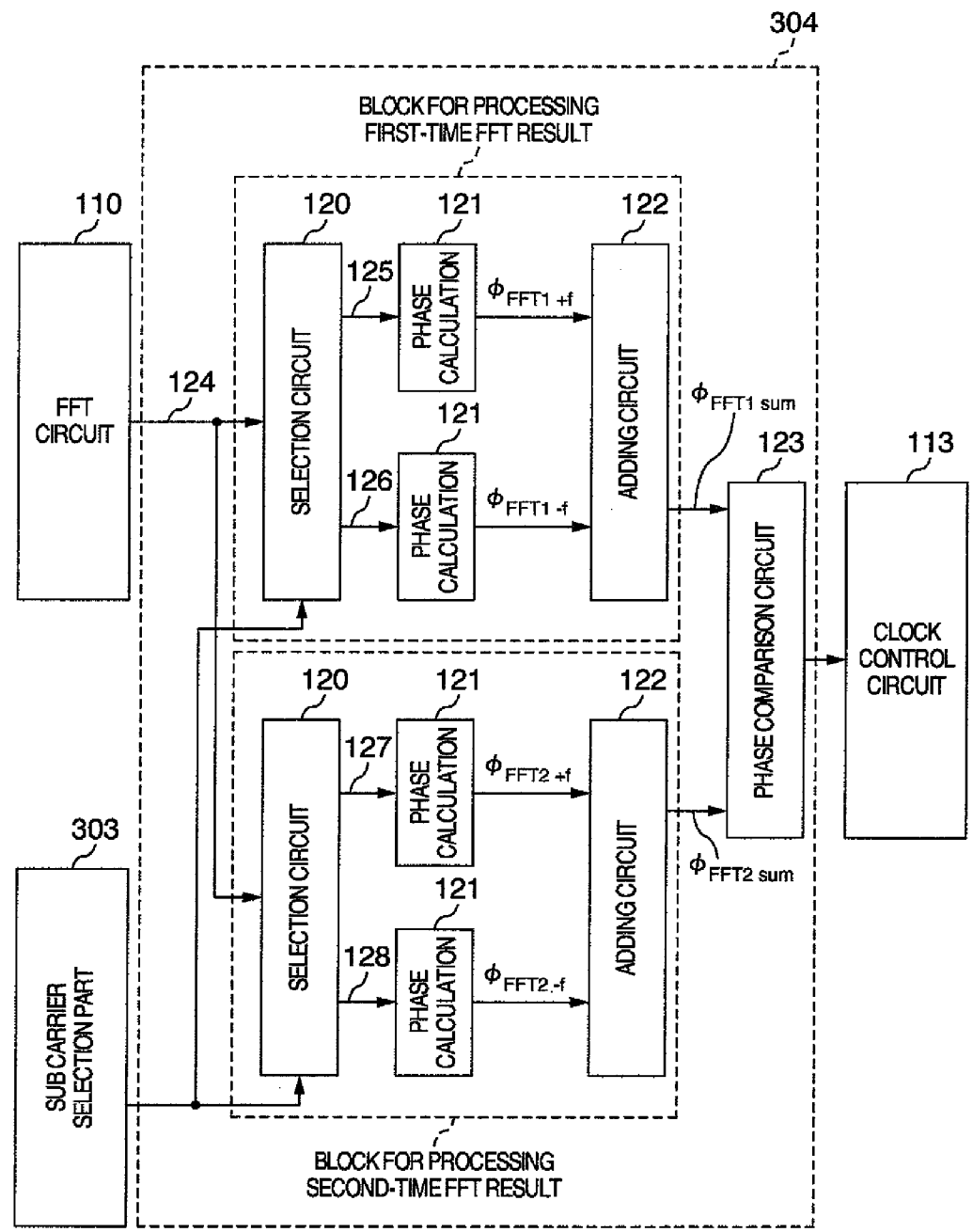
FIG. 10 is a block diagram illustrating an example of a frequency error detection part used in the OFDM demodulator of FIG. 9 in detail.

FIG. 10 is a block diagram illustrating an example of the frequency error detection part 304 shown in FIG. 9 in detail. The frequency error detection part 304 has substantially the same configuration as that of the frequency error detection part 112 shown in FIG. 5. The like elements to those shown in FIGS. 5 and 9 are designated by like reference numerals.

FIG. 10 is different from FIG. 5 in that when the sub carrier used for carrier synchronization is selected by the selection circuit 120, the information notified from the sub carrier selection part 303 is used. The selection circuit 120 selects a plurality of sub carriers used to detect an error in frequency of the reproduction carrier from the OFDM frequency domain signals 124 for sub carriers on the basis of the information notified. In this selection, at least 1 or more pairs of sub carriers of paired frequencies that are equally apart in the positive and negative directions from the frequency 0 of sub carrier are selected from the sub carriers notified by the sub carrier selection part 303 similarly to the embodiment 1. Operation of other blocks shown in FIG. 10 is the same as that of FIG. 5 in the embodiment 1 and accordingly detailed description thereof is omitted.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An OFDM demodulator which receives modulated OFDM waves to be demodulated, comprising:
   orthogonal demodulation means for orthogonally demodulating the modulated OFDM waves using reproduction carrier and get an OFDM baseband signal;
   Fourier transform means for Fourier transforming the OFDM baseband signal gotten by the orthogonal demodulation means into an OFDM frequency domain signal for each sub carrier;
   operation range decision means for detecting a boundary position of symbol of the OFDM baseband signal gotten by the orthogonal demodulation means and decide 2 or more different operation ranges of the Fourier transform for the same OFDM symbol on the basis of the boundary position of the symbol;
   Fourier transform control means for controlling the Fourier transform means so as to perform the Fourier transform for the 2 or more operation ranges decided by the operation range decision means;
   frequency error detection means for calculating phases of sub carriers on the basis of results of the Fourier transform for the 2 or more operation ranges and compare the calculated phases for each of the results of the Fourier transform so that an error in frequency of the reproduction carrier is detected on the basis of the compared result; and
   clock control means for controlling the frequency of the reproduction carrier on the basis of the error in frequency of the reproduction carrier detected by the frequency error detection means.

2. An OFDM demodulator according to claim 1, wherein the frequency error detection means performs the following:
   getting at least 2 or more results of the Fourier transform from the results of the Fourier transform for the 2 or more operation ranges;
   selecting at least 1 or more pairs of sub carriers of paired frequencies that are equally apart in positive and negative directions from a reference frequency of sub carriers out of the gotten results of the Fourier transform;
   calculating phases of sub carriers on the basis of the selected results of the Fourier transform of sub carriers;
   adding the calculated phases of sub carriers for each of the results of the Fourier transform;
   comparing the added phases for each of the results of the Fourier transform; and
   detecting the error in frequency of the reproduction carrier on the basis of the compared results.

3. An OFDM demodulator according to claim 2, further comprising
   reliability detection means for detecting reliability of sub carriers
   and wherein
   the frequency error detection means performs the following:
   selecting sub carriers used from plural times of results of the Fourier transform on the basis of the reliability of sub carriers detected by the reliability detection means;
   calculating phases of sub carriers from the results of the Fourier transform of the selected sub carriers;
   adding the calculated phases of the sub carriers for each of the results of the Fourier transform;
   comparing the added phases for each of the results of the Fourier transform; and
   detecting the error in frequency of the reproduction carrier on the basis of the compared results.

4. An OFDM demodulator according to claim 3, wherein the reproduction carrier is synchronized with a sampling clock of A/D conversion.

5. An OFDM demodulator according to claim 1, further comprising
   reliability detection means for detecting reliability of sub carriers
   and wherein
   the frequency error detection means performs the following:
   selecting sub carriers used from plural times of results of the Fourier transform on the basis of the reliability of sub carriers detected by the reliability detection means;
   calculating phases of sub carriers from the results of the Fourier transform of the selected sub carriers;
   adding the calculated phases of the sub carriers for each of the results of the Fourier transform;
   comparing the added phases for each of the results of the Fourier transform; and
   detecting the error in frequency of the reproduction carrier on the basis of the compared results.

6. An OFDM demodulator according to claim 1, wherein the reproduction carrier is synchronized with a sampling clock of A/D conversion.

7. An OFDM demodulator according to claim 2, wherein the reproduction carrier is synchronized with a sampling clock of A/D conversion.

8. An OFDM demodulator according to claim 5, wherein the reproduction carrier is synchronized with a sampling clock of A/D conversion.

* * * * *